Patented Nov. 18, 1947

2,431,004

UNITED STATES PATENT OFFICE 2,431,004

METHOD FOR PRODUCING ETHYL ALCOHOL

Lynferd J. Wickerham, Peoria, Ill., assignor to United States of America, as represented by the Secretary of Agriculture No Drawing. Original application July 1, 1944, Serial No. 543,181. Divided and this application December 3, 1946, Serial No. 713,733

3 Claims. (Cl. 195—37)

(Granted under the act of March 3, 1883, as amended April 30, 1928; 370 O. G. 757)

This application is made under the act of March 3, 1883, as amended by the act of April 30, 1928, and the invention herein described, if patented, may be manufactured and used by or for the Government of the United States of America for governmental purposes without the payment to me of any royalty thereon.

This is a division of my copending application for patent, Serial No. 543,181, filed July 1, 1944.

This invention relates to a new and useful enzyme preparation and to methods for producing the same.

Diastatic enzymes find wide application in industrial fields, such as in the desizing of textiles and in the liquefaction, dextrinization, and saccharification of starchy materials in the brewing and distilling industries. Up to the present time, the principal sources of such enzymes have been soybeans, bacterial and mold preparations, and modified grains, such as germinated barley and germinated wheat. Yeasts are generally considered to lack the ability to hydrolyze or ferment starches; it is for this reason that diastatic enzymes from outside sources are used to convert starchy mashes prior to fermentation by yeast.

In 1907, Lindner (Wochenschrift für Brauerei 24 (36) 469–474) reported that the yeast *Endomyces fibuliger* was entirely unable to ferment dextrins, and in 1909, Dombrowski (Compt. rend. trav. lab. Carlsberg 7, 247–266) reported that the same yeast did not produce diastase under the conditions of his experiments. Saito (Report of the Central Laboratory of the Southern Manchurian Railroad, No. 1, p. 1 (1913), and Zeitschrift für Gärungsphysiologie II, 3: 151–153 (1914)) reported the isolation of two new yeasts, *Endomyces lindneri* and *Endomyces hordei*. The yeasts used by Lindner, Dombrowski, and Saito are now classified as *Endomycopsis fibuliger* or varieties of *Endomycopsis fibuliger*, such as *Endomycopsis fibuliger* var. *lindneri* or *Endomycopsis fibuliger* var. *hordei*, as a result of the authoritative work of H. M. Stelling-Dekker, Die Hefesammlung des Centralbureau voor Schimmelcultures, I. Teil. Die Sporogenen Hefen. Koninklijke Akademie van Wetenschappen. Amsterdam 1931. Yeasts of this genus are distinguished by their ability to produce hyphae, to reproduce asexually by budding, and to form ascospores.

In contrast to the prior art, I have discovered that yeasts of the species *Endomycopsis fibuliger* or varieties of this species are capable of the production of large quantities of diastase when cultivated on starchy materials, such as cooked grain mashes, moist brans, moist bread, and the like. Grain mashes prepared from corn, wheat, rye, and barley are suitable, and corn bran, wheat bran, oat hulls and the like may also be used. Although the providing of air to the growing yeast culture is not absolutely essential to obtain diastase production, I have found that free access of air to the yeast and substrate during the incubation period is favorable to the formation of diastase. Accordingly, use of a medium made of coarse bran or loosely packed bread is desirable, as is also the supplying of air or oxygen-containing gases to cultures developing in contact with either liquid or solid medium. I have observed that some strains of *Endomycopsis fibuliger* produce diastase abundantly without the addition to the medium of a neutralizing agent, such as calcium carbonate, whereas other strains of this species require such addition to the medium in order to attain good diastase production. Accordingly, this invention embodies diastase production by yeasts of the species *Endomycopsis fibuliger* on media with which a neutralizing agent, such as calcium carbonate, may or may not have been incorporated. When such neutralizing agents are used, very small quantities, of the order of one to two grams per kilogram of medium, are sufficient.

When it is desired to produce diastase by cultivating *Endomycopsis fibuliger* or varieties of this species in liquid culture, grain mashes are most suitably and economically used. Mashes of such concentration as to contain 10 to 200 grams of grain per liter of mash may be used, although for economy and ease of handling, I prefer mashes containing approximately 50 grams of grain per liter of mash. It is essential that the mash be cooked prior to use as a substrate for the cultivation of the yeast, so as to assure the development of a pure culture and so as to gelatinize the starch, thus making it readily available for the yeast. It is, of course, possible to cultivate the yeast on a synthetic liquid nutrient medium, but this procedure is more expensive and, in my experience, offers no advantages.

In preparing solid media for the cultivation of *Endomycopsis fibuliger* and varieties of this species, it is desirable that the starch-containing material, such as bran or bread, be slightly moistened with water prior to sterilization and inoculation with the yeast.

Temperatures within the range 15° to 40° C. have been found suitable for growth of Endomycopsis species and the production of diastase therefrom. Temperatures of approximately 30° to 33° C. are especially suitable.

The diastatic enzymes produced by *Endomycopsis fibuliger* and varieties of this species have been found to consist predominantly of alpha-amylase, the liquefying and dextrinizing enzyme, with a much smaller quantity of beta-amylase, the saccharifying enzyme. In this respect, the yeast product is similar to the diastatic enzymes elaborated by molds and bacteria. Determinations of alpha-amylase potency of the yeast preparations by the method of Sandstedt, Kneen, and Blish (Cereal Chemistry 16: 712–723 (1939)) and of beta-amylase potency by the method of Blish and Sanstedt (Cereal Chemistry 10: 189–202 (1933)) have shown that, per gram of dry substance, as much as 500 units of alpha-amylase and as much as 25 units of beta-amylase may be produced by *Endomycopsis fibuliger* and varieties of that species which are cultivated upon starchy materials. When analyzed by the same methods, freshly ground, kiln-dried barley malt shows a content of approximately 30 units of alpha-amylase and 15 units of beta-amylase. The high alpha-amylase content of the yeast enzyme preparation favors its use in numerous commercial applications where the liquefaction or dextrinization of starch is desired. The beta-amylase content, taken in conjunction with the high alpha-amylase content, is sufficient to bring about adequate conversion of starchy mashes to fermentable sugars when the diastatic yeast or the diastatically active preparation derived therefrom is in contact with the starchy mash during a fermentation period.

The enzyme preparation resulting from the methods of my invention may be used in the wet state, as obtained directly from the culture medium, or it may be dried at low temperatures, so selected as not to injure the enzyme. Procedures well known to the art for drying barley malt and moldy bran are suitable for drying the yeast enzyme preparation. It is to be noted that the diastatic enzymes produced by the cultivation of the Endomycopsis strains are extra-cellular, and as such are readily available for practical use.

I have observed that the principal metabolic products of the growth of *Endomycopsis fibuliger* and varieties of this species on carbohydrate mashes are ethyl alcohol and carbon dioxide. This circumstance is favorable to the symbiotic or synergistic cultivation of *Endomycopsis fibuliger* species with strongly fermentative yeasts on starchy substrates for the production of ethyl alcohol. In such cases, the Endomycopsis species function mainly as starch-converting agents and the more highly fermentative yeasts, such as species of Saccharomyces, for example, *Saccharomyces cerevisiae*, function as agents for the conversion of the fermentable starch-conversion products to ethyl alcohol. Any ethyl alcohol produced by the Endomycopsis species during the fermentation period is merely supplementary to that produced by the Saccharomyces, and no decrease in over-all alcohol yield is encountered. The microbiological saccharifying agents, such as Rhizopus species and Aspergillus species currently used in conjunction with Saccharomyces for alcohol production are inclined to form acids, such as lactic acid, citric acid, and kojic acid, thereby creating an unfavorable acidity in the mash and also diverting sugar from the formation of alcohol.

By virtue of the described properties, *Endomycopsis fibuliger* and its varieties, as well as the enzyme preparations derived from the cultivation of such yeasts on starchy materials, are suitable for use in preparing and fermenting starchy mashes for the production of a wide variety of other fermentation products, such as 2,3-butanediol, butanol-1, acetone, gluconic acid, citric acid, and the like, and the application of the methods of my invention in this manner are within the scope of this invention.

As illustrative of the manner in which my invention may be practiced, the following examples are presented, although the details are to be considered in no way restrictive:

Example I

A mash was prepared by cooking together 5 grams of ground wheat, 0.2 gram of calcium carbonate, and 97 ml. of water. After cooling, the mash was inoculated with a culture of *Endomycopsis fibuliger*, and sterile air was bubbled through the mash at a rate of 20 ml. per minute. After four days' incubation at 30° C., with constant aeration, the starch test, using iodine, was negative, indicating that the diastatic properties of *Endomycopsis fibuliger* had been active under the conditions of the experiment.

Example II

One-half slice of crust-free white bread was placed in a 200 ml. Erlenmeyer flask, which was stoppered with a cotton plug and sterilized by steaming at 15 pounds' pressure for 20 minutes. After cooling, the bread was inoculated with a broth culture of *Endomycopsis fibuliger* and incubated at 30° C. Determination of alpha-amylase and beta-amylase at various times after inoculation showed the following results:

| Incubation Period, Days | Alpha-Amylase (Units per gram of dry material) | Beta-Amylase (Units per gram of dry material) |
|---|---|---|
| 2 | 58 | 3 |
| 4 | 260 | 6 |
| 6 | 385 | 16 |
| 9 | 490 | 25 |

Example III

Five grams of wheat bran, 25 ml. of water, and 0.05 gram of calcium carbonate were mixed in a 200 ml. Erlenmeyer flask. The cotton-stoppered flask and contents were sterilized at 15 pounds' steam pressure for one hour. After cooling, the medium was inoculated with a broth culture of *Endomycopsis fibuliger* var. *lindneri* and incubated at 30° C. in a horizontal position to promote aeration. Periodic determination of alpha-amylase and beta-amylase by the previously cited methods showed the following results:

| Incubation Period, Days | Alpha-Amylase (Units per gram of dry material) | Beta-Amylase (Units per gram of dry material) |
|---|---|---|
| 2 | 75 | 3 |
| 4 | 120 | 4 |
| 6 | 58 | 2.5 |
| 9 | 25 | 2 |

Example IV

A wheat mash was prepared by suspending 20 grams of ground wheat in 87 ml. of water, gelatinizing, and sterilizing one hour at 15 pounds' steam pressure. After cooling the medium, it was inoculated with 5 ml. of a suspension of cells of *Endomycopsis fibuliger* var. *hordei* and 3 ml. of a suspension of cells of *Saccharomyces cerevi-*

*siae*, and incubated at 30° C., without aeration, for 96 hours. Analysis of the mash at that time showed an alcohol content of 5.48 grams, or a fermentation efficiency of 78.3 percent, based on the sugar and starch content of the original mash. A control in which malt was used as the saccharifying agent instead of Endomycopsis showed a fermentation efficiency of 80.5 percent.

Having thus described my invention, I claim:

1. A method for producing ethyl alcohol by fermentation comprising cultivating yeasts of the species *Endomycopsis fibuliger* in symbiosis together with yeasts of the genus Saccharomyces in contact with a starch-containing substrate.

2. A method for producing ethyl alcohol by fermentation comprising cultivating yeasts of the species *Endomycopsis fibuliger* in symbiosis together with yeasts of the genus Saccharomyces in contact with a cooked grain mash.

3. A method for producing ethyl alcohol by fermentation comprising cultivating yeasts of the species *Endomycopsis fibuliger* together with the yeast *Saccharomyces cerevisiae* in contact with a starch-containing substrate.

LYNFERD J. WICKERHAM.

REFERENCES CITED

The following references are of record in the file of this patent:

Chemical Abstracts 27, 3968[1] (1933).
Chemical Abstracts 29, 5984[9] (1935).
Chemical Abstracts 24, 3804[3] (1930).